US012725605B2

(12) United States Patent
Tyagi et al.

(10) Patent No.: US 12,725,605 B2
(45) Date of Patent: Sep. 1, 2026

(54) SYNTHETIC SPEECH GENERATION WITH FLEXIBLE EMOTION CONTROL

(71) Applicant: NVIDIA Corporation, Santa Clara, CA (US)

(72) Inventors: Siddharth Tyagi, Bangalore (IN); Jason Conrad Roche, Santa Clara, CA (US); José Rafael Valle Gomes da Costa, Berkeley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 75 days.

(21) Appl. No.: 18/634,788

(22) Filed: Apr. 12, 2024

(65) Prior Publication Data

US 2025/0322821 A1 Oct. 16, 2025

(51) Int. Cl.
*G10L 13/02* (2013.01)
*G10L 13/08* (2013.01)
*G10L 25/63* (2013.01)

(52) U.S. Cl.
CPC .............. *G10L 13/02* (2013.01); *G10L 13/08* (2013.01); *G10L 25/63* (2013.01)

(58) Field of Classification Search
CPC ......... G10L 13/02; G10L 25/30; G10L 25/63; G10L 13/08
See application file for complete search history.

(56) References Cited

U.S. PATENT DOCUMENTS 12,008,621 B1 * 6/2024 Atef ...................... G06F 16/953
2009/0234652 A1 * 9/2009 Kato ...................... G10L 13/10 704/260
2013/0080172 A1 * 3/2013 Talwar .................... G10L 25/69 704/260
2013/0211838 A1 * 8/2013 Park ...................... G06F 40/242 704/260
2017/0255616 A1 * 9/2017 Yun ...................... G10L 13/0335
2019/0228793 A1 * 7/2019 Chen ...................... G06N 20/00
2020/0058290 A1 * 2/2020 Chae ...................... G10L 13/00
2020/0176019 A1 * 6/2020 Park ...................... H04M 1/724
2020/0211528 A1 * 7/2020 Lee ...................... G06N 3/094
2020/0388283 A1 * 12/2020 Tang ...................... G10L 15/26
2021/0090551 A1 * 3/2021 Jang ...................... G10L 13/08
2021/0287657 A1 * 9/2021 Deng ...................... G06F 40/30
2023/0099732 A1 * 3/2023 Mukherjee ........... G06N 3/0442 704/258
2023/0230576 A1 * 7/2023 Nolasco ................ G10L 13/027 704/260

(Continued)

OTHER PUBLICATIONS

Zhu, Xiaolian, and Liumeng Xue. "Control Emotion Intensity for LSTM-Based Expressive Speech Synthesis." International Conference of Pioneering Computer Scientists, Engineers and Educators. Singapore: Springer Singapore, 2019.*

(Continued)

*Primary Examiner* — Shaun Roberts
(74) *Attorney, Agent, or Firm* — Lowenstein Sandler LLP

(57) ABSTRACT

Disclosed are apparatuses, systems, and techniques that may use machine learning for generating artificial speech. The techniques include generating a synthetic speech using a machine learning model-readable speech embedding associated with a target degree of an emotion and obtained by combining a plurality of reference speech embeddings associated with respective reference degrees of the emotion.

20 Claims, 12 Drawing Sheets

(56) References Cited

U.S. PATENT DOCUMENTS

| | | | | |
|---|---|---|---|---|
| 2024/0005905 | A1* | 1/2024 | Chen | G10L 25/63 |
| 2024/0289360 | A1* | 8/2024 | Chepkwony | G06F 16/3328 |
| 2024/0321259 | A1* | 9/2024 | Zhan | G10L 13/08 |

OTHER PUBLICATIONS

Zhu, Xiaolian, and Liumeng Xue. “Building a controllable expressive speech synthesis system with multiple emotion strengths.” Cognitive Systems Research 59 (2020): 151-159.*

* cited by examiner

SYNTHETIC SPEECH GENERATION WITH FLEXIBLE EMOTION CONTROL

TECHNICAL FIELD

At least one embodiment pertains to processing resources used to perform and facilitate text-to-speech (TTS) synthesis. For example, at least one embodiment pertains to neural networks that facilitate accurate modeling of speech attributes and generation of speech synthesis of high quality.

BACKGROUND

Speech synthesis commonly involves analyzing existing speech samples and correlating various phonemes (units of speech), pauses, etc., in samples of a person's spoken speech with respective text of the speech. The text-phoneme associations gleaned from such analysis can then be applied to generate sound (voice) representations of new text. While simple mechanistic text-to-speech (TTS) synthesis is well developed, high-quality TTS synthesis remains a challenging problem. In particular, various speech attributes, e.g., intonation, volume, etc., vary from occurrence to occurrence, and from text to text, with various contextual attributes (e.g., emotions, type and content of the text, etc.) affecting the specifics of that person's speech. Moreover, even within a single episode of speech, the same person can pronounce the same words slightly differently, depending on the changes in breathing, rhythm, emotions, etc. Deterministic synthetic speech that fails to simulate such natural variations sounds robotic to a human ear, lacks expressiveness, and may fail to capture the attention of a listener.

DETAILED DESCRIPTION

Figure 1:
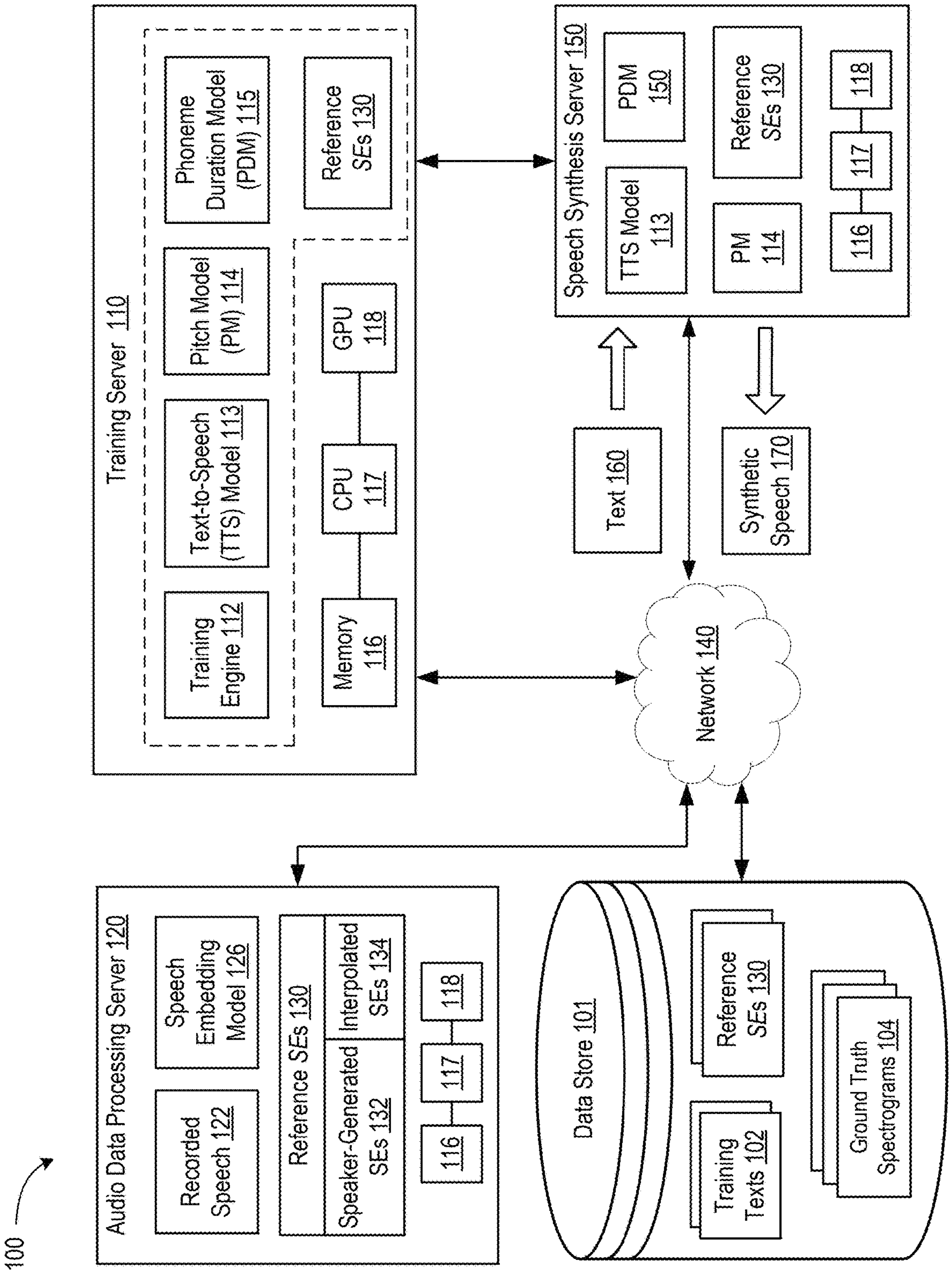
FIG. 1 is a block diagram of an example computer system capable of deploying text-to-speech (TTS) systems that generate synthetic speech with flexible emotion control, according to at least one embodiment.

Conversational AI systems (e.g., digital agents, chat bots, digital assistants, non-player characters (NPCs), and/or the like) deploy user-produced conversational prompts to generate a text of a response, e.g., using a Large Language Model (LLM). The LLM is often capable of outputting an emotion (e.g., joy, sadness, etc.) that is associated with the response and an intensity of the emotion. To facilitate conversational dialogues, the AI system can further deploy a Text-To-Speech (TTS) model that converts the LLM text outputs into an audio of a synthetic speech with utterances of the text outputs generated using a human-like voice, e.g., a voice that emulates characteristics of some specific human speaker or a human-like synthetic voice. A TTS is often trained to determine the emotion associated with the input texts. However, the TTS makes such determinations independently of the LLM and does not take advantage of the LLM-determined emotion and/or its intensity. Moreover, TTS are usually incapable of varying or otherwise controlling an intensity of the emotion in the generated audio. Instead, a TTS generates a single degree of a particular emotion, without a fine differentiation of its intensity, instead modifying the voice in the same way regardless of whether the speaker uttering the text is mildly or extremely sad, in one example. This mismatch in the handling of the emotions by an LLM together with the inability of the TTS to adjust the degree of emotion can result in a disparity between the emotional context of the generated speech and its semantic content. This can sound unnatural and/or confusing to a user (e.g., recipient of the speech) and result in an unsatisfactory user experience.

Aspects and embodiments of the present disclosure address these and other technological challenges by providing for systems and techniques that allow flexible control of intensity of emotions generated by TTS models. In some embodiments of the disclosure, a speech produced by a human speaker may be recorded in at least two emotional contexts. For example, one speech utterance may be recorded in a neutral (N, emotionless) voice of a speaker and another speech utterance (having the same or different semantic content) may be recorded with a specific strong emotion, also referred to as a high (H) emotion herein. For example, the emotion can include sadness, excitement, joy, skepticism, disbelief, surprise, sarcasm, enthusiasm, fear, compassion, and/or any other human emotion. The recorded utterances may be processed by a speech embedding model that encodes ("embeds") various characteristics of speech as a vector (feature vector, embedding) in a multi-dimensional embedding space. The characteristics of the speech may include a pitch frequency, rhythm, cadence (speed) of the speech, duration and pronunciation of various units (e.g., phonemes, words, sub-words, etc.) of speech, timbre, and/or the like. The model-generated speech embedding SE(ID,E,I) may be indexed by a speaker identity ID, emotion E, and emotion intensity I. Initially, in addition to the neutral speech, a single emotion intensity may be recorded, e.g., high intensity I=H, which may be as strong intensity as one may expect in the type of the conversation and/or other type of interaction, e.g., interaction with a non-player character (NPC), in a computer game, in one example, or a synthetic speaker reading a newspaper article, in another example. The neutral intensity SE(ID,N,-) may be indexed by just the speaker ID and may represent a common baseline for multiple types of emotions E. The high intensity embedding and the neutral embedding may serve as anchor embeddings (also referred to as reference speech embeddings herein) for generating speech of intermediate intensity.

Subsequently, a set of interpolated embeddings may be obtained. For example, a medium intensity embedding I=M may be obtained as a linear combination, e.g., an average, of the high intensity speech embedding and the neutral embedding, $$SE(ID, E, M) = \frac{1}{2}[SE(ID, E, H) + SE(ID, N, -)].$$

The medium intensity speech embedding SE(ID,E,M) may then be used as an input into a TTS model trained to generate speech, given an input text to be uttered and a speech embedding, $$TTS(\text{Text}; SE(ID, E, M)) \to \text{Speech}.$$

The generated Speech may be assessed, e.g., by a human listener, for the degree of emotion E associated with the speech. In the instances where the assessment determines that Speech indeed corresponds to the medium intensity of emotion E, the embedding SE(ID,E,M) may be added to the set of anchor embeddings: SE(ID,N,-), SE(ID,E,M), SE(ID, E,H). In the instances where the assessment determines that Speech does not appropriately convey the medium intensity of emotion E, the human speaker may record the same Text (or some other sample text) with the medium intensity of emotion E. The recorded speech may then be processed by the speech embedding model to generate a replacement for the embedding SE(ID,E,M). The replacement embedding may then be added to the set of anchor embeddings.

The above-described process may continue for a target number K of the anchor embeddings {SE(ID,E,$I_j$); j=1 . . . K}, with increased granularity of emotion intensities added at additional iterations. For example, a speech embedding SE(ID,E,W) associated with weak intensity I=W may be obtained as an interpolation between the neutral embedding SE(ID,N,-) and the medium intensity embedding SE(ID,E, M), and speech embedding SE(ID,E,A) associated with advanced intensity I=A may be obtained as an interpolation between the medium intensity embedding SE(ID,E,M) and the high intensity embedding SE(ID,E,H). In those instances where the generated speech embeddings fail to produce test speech of the desired emotion intensity $I_j$, the speech embedding may be generated using the recorded speech produced by the human speaker. This process may continue until a target number K of the anchor embeddings has been collected. In some embodiments, K=1 or K=2 anchor embeddings (not counting the neutral anchor embedding) may be sufficient for a specific task (or a plurality of tasks). In some embodiments, a larger number K of the anchor speech embeddings may be used. The number K may be limited by ability of a human speaker to produce progressively finer differentiations of the emotion intensities $I_j$ and/or ability of a human listener to distinguish such progressively finer differentiations of emotions.

The set of generated anchor embeddings may subsequently be used to generate speech of a target emotion intensity. In some embodiments, the target emotion intensity may be determined by an LLM that is deployed to support a human-like conversation or by some other agent, e.g., a computer game, and/or the like. In some embodiments, the target intensity $I_T$ may vary between the neutral intensity I=0 and the maximum (high) intensity I=1. A pair of anchor intensities $I_j$ and $I_{j+1}$ may then be identified as the closest to the target intensity $I_T$. For example, if K=4 anchor embeddings are deployed, e.g., weak ($I_1$=0.25), medium ($I_2$=0.5), advanced ($I_3$=0.75), and high ($I_4$=1.0), and the target intensity is $I_T$=0.4, the closest pair includes the weak ($I_1$=0.25) and medium ($I_2$=0.5) anchor embeddings. The identified pair of embeddings may be used to generate an interpolated (weighted) target embedding with the two closest anchor embedding taken with appropriate weights. In one example embodiment, the weights may be inversely proportional to the distance to embeddings, e.g., $$SE(ID, E, I_T) = \frac{I_2 - I_T}{I_2 - I_1} \times SE(ID, E, I_1) + \frac{I_T - I_1}{I_2 - I_1} \times SE(ID, E, I_2).$$

The interpolated speech embedding SE(ID,E,$I_T$) with the target intensity $I_T$ of emotion E may be used as an input into a TTS model, together with a target text, to generate an audio of the target text pronounced by speaker of a specific ID with the target emotion intensity.

The advantages of the disclosed techniques include, but are not limited to, flexible control of emotional content of synthetic speech. The disclosed systems and techniques do not impose additional requirements on processing and/or memory resources that are used to train or deploy text-to-speech models, speech embedding models, and/or the like. Moreover, the existing techniques may be used for mixing of the emotions. For example, if two (or more) emotions $E_1$ and $E_2$ are to be mixed with target intensities $I_{T1}$ and $I_{T2}$, a target speech embedding may be obtained by, e.g., (i) generating speech embeddings SE(ID,$E_1$,$I_{T1}$) and SE(ID,$E_2$,$I_{T2}$) for each emotion (based on the respective target intensities $I_{T1}$ and $I_{T2}$) and (ii) obtaining a linear combination of the generated speech embeddings associated with the individual emotions. In those embodiments where no relative amount of the multiple emotions is specified, the two speech embeddings SE(ID,$E_1$,$I_{T1}$) and SE(ID,$E_2$,$I_{T2}$) may be represented equally in the final speech embedding. In those embodiments wherein the relative amount of the emotions is specified, the two speech embeddings may be correspondingly weighted to obtain the final speech embedding. The final speech embedding may then be used to produce the target synthetic speech.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, mixed reality content, systems incorporating one or more virtual machines (VMs), systems for performing synthetic data generation operations, systems implemented at least partially in a data center, systems for performing generative AI operations, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implementing one or more visual language models (VLMs), systems implemented at least partially using cloud computing resources, and/or other types of systems.

System Architecture

FIG. 1 is a block diagram of an example computer system 100 capable of deploying text-to-speech (TTS) systems that generate synthetic speech with flexible emotion control, according to at least one embodiment. As depicted in FIG. 1, a computer system 100 may include a data store 101, a training server 110, an audio data processing server 120, and a speech synthesis server 150, which may be connected via a network 140. Network 140 may be a public network (e.g., the Internet), a private network (e.g., a local area network (LAN), a wide area network (WAN)), a wireless network, a personal area network (PAN), a combination thereof, and/or another network type. Computer system 100 may be configured to process text 160 to generate synthetic speech 170, e.g., a suitable audio representation of uttered text 160, such as a spoken version of text 160 synthesized based on text-speech data stored in data store 101 and processed by training server 110 and/or audio data processing server 120.

Any, some, or all of the training server 110, audio data processing server 120, speech synthesis server 150 may be hosted a desktop computer, a laptop computer, a smartphone, a tablet computer, a server, a wearable device, a virtual reality/augmented reality/mixed reality headset or heads up display, a digital avatar or chat bot kiosk, an in-vehicle infotainment computing device, and/or any suitable computing device capable of performing the techniques described herein. In at least one embodiment, speech synthesis server 150 may be a part of training server 110 and/or audio data processing server 120. In other embodiments, speech synthesis server 150 may be communicatively coupled to training server 110 and/or audio data processing server 120 directly (e.g., via a bus) or via a network that is different from network 140.

Training server 110 may train a number of machine learning models, which in some embodiments may be neural network models. The trained models may include a TTS model 113, which may use, as an input, a suitable digital representation of a text (e.g., training text 102 stored in data store 101), referred to as a text embedding herein. The input into TTS model 113 may further include a suitable digital representation of speech attributes of a given (actual or synthetic) speaker (referred to as a speech embedding, SE, herein). TTS model 113 may process the input and generate, as an output, audio data for a synthetic speech produced by the given speaker.

A text embedding may include a set of one or more tokens that represent, using any suitable encoding scheme, alphanumeric symbols (e.g., letters, numbers, glyphs, etc.) and/or punctuation marks of a particular language.

A speech embedding SE may encode both physical features of the speaker's voice, e.g., pitch frequency, timbre, accent, pronunciation of various sounds, and/or the like, that are intrinsic to the speaker and vary little for different utterances produced by that speaker, and contextual features of the speaker's speech, including volume, cadence, emotions, and/or the like, that may vary significantly for different utterances produced by the same speaker. In some embodiments, speech embeddings may be produced by one or more preprocessing components of TTS model 113 and are learned in the course of training of TTS model 113. In some embodiments, speech embeddings may be produced by an auxiliary model, e.g., a speech embeddings model 126 (shown as part of audio data processing server 120), which may be trained separately.

Training of TTS model 113 may be facilitated by training engine 112. During training, TTS model 113 may learn to associate input training texts 102 and speech embeddings SE with ground truth audio data that represents spoken training texts 102, e.g., by various speakers. In some embodiments, ground truth audio data may include ground truth spectrograms 104 of a speech of a person pronouncing a respective training text 102. A ground truth spectrogram 104 may be obtained by recording air pressure caused by the speech as a function of time and computing a short-time Fourier transform for overlapping time intervals (frames) of a set duration. This maps the audio signal from the time domain to the frequency domain and results in a ground truth spectrogram 104 characterizing the spectral content of the speech. The amplitude of the audio signal may be represented on a logarithmic (decibel) scale. In some embodiments, the spectrograms may be mel-spectrograms, in which frequency f is transformed into a non-linear mel domain, $f \rightarrow m = a \ln(1+f/b)$, to take into account the ability of a human ear to distinguish better equally spaced frequencies (tones) at the lower end of the frequencies of the audible spectrum than at its higher end. In one example, $a=1107$ and $b=700$ Hz. Throughout this disclosure, the term spectrogram should also be understood to include, in embodiments, such mel-spectrograms.

During training, TTS model 113 uses text embeddings and speech embeddings to generate training outputs that include audio data with the model-generated spoken training texts 102. Training engine 112 may use a suitable loss function to evaluate a difference (mismatch) between the output audio data and a ground truth audio data (e.g., ground truth spectrograms 104 of human speakers) and use the loss function to modify/update/adjust parameters of the TTS model 113 and any pertinent subnetworks of TTS model 113, e.g., to reduce or minimize the evaluated difference. In some embodiments, TTS model 113 may deploy, e.g., as subnetworks or auxiliary models, a pitch model (PM) 114 and a phoneme duration model (PDM) 115. PM 114 may be trained to generate audio characteristics (e.g., fundamental pitch frequency p(t) and/or energy e(t) or volume) for various units (e.g., phonemes) of speech. In some embodiments, characteristics of speech may include fundamental frequency (pitch) p(t) and/or volume or energy e(t) of the speech. PDM 115 may be trained to determine the timing (duration) of various phonemes of speech. In some embodiments, PM 114 and/or PDM 115 may be trained (e.g., pre-trained) separately from TTS model 113. In some embodiments, PM 114 and/or PDM 115 may be trained together with TTS model 113, e.g., using a loss function that evaluates errors in the generated audio characteristics and/or errors in timing together with errors in the output spectrograms. In some embodiments, separate loss functions may be used to evaluate errors in audio characteristics, timing and/or the output spectrograms.

During training, TTS model 113 learns to correlate speech characteristics (encoded via speech embeddings) and training texts 102 with ground truth spectrograms 104 to generate human-like synthetic speech. Following training, TTS model 113 may be deployed (e.g., together with PM 114 and/or PDM 115) by a speech synthesis server 150 to synthesize new synthetic speech 170 for (inference) texts 160 previously not processed by TTS model 113.

In some embodiments, during training and/or deployment, TTS model 113 may use a set of reference speech embeddings (anchor embeddings) SE 130 that indicate various levels (intensities) of emotions for a given speaker. In some embodiments, reference SEs 130 may be generated by audio data processing server 120 using recorded speech 122 associated with different intensities of emotions. Speech embedding model 126 may process recorded speech 122 (e.g., spectrograms of recorded speech 122) and generated a neutral reference SE that is devoid of emotions and one or more speech embeddings—referred to as speaker-generated SEs 132—with different levels of presence of a particular emotion E. Additional reference speech embeddings 130, e.g., interpolated SEs 134, may be generated by interpolating between speaker-generated speech embeddings 132. The resulting set of K reference speech embeddings 130, $\{SE(ID,E,I_j); j=1 \ldots K\}$, may then be used in training of TTS model 113 (e.g., using training engine 112) and/or in inference using trained TTS model 113 (e.g., using speech synthesis server 150) to facilitate flexible control of emotions during generation of synthetic speech. In some embodiments multiple sets of reference speech embeddings 130 may be generated and used, e.g., sets $\{SE(ID,E,I_j)\}$ generated for different types of emotions E, different speakers ID, and/or the like.

In some embodiments, data store 101 may include a persistent storage capable of storing textual files, audio files, audio spectrogram data, and/or various metadata for the stored data. Data store 101 may be hosted by one or more storage devices, such as main memory, magnetic or optical storage disks, tapes, or hard drives, network-attached storage (NAS), storage area network (SAN), and so forth. Although depicted as separate from part of training server 110, audio data processing server 120, and/or speech synthesis server 150, in at least one embodiment, data store 101 may be a part of one or more aforementioned machines. In at least some embodiments, data store 101 may be a network-attached file server, while in other embodiments data store 101 may be some other type of persistent storage, such as an object-oriented database, a relational database, and so forth, that may be hosted by a server machine or one or more other machines coupled to training server 110, audio data processing server 120, and/or speech synthesis server 150, e.g., via network 140 and/or one or more additional networks.

Any, some, or all of training server 110, audio data processing server 120, and/or speech synthesis server 150 may include one or more memory devices 116, or units communicatively coupled to one or more processing devices, such as one or more central processing units (CPU) 117 and/or one or more graphics processing units (GPU) 118, data processing units (DPUs), parallel processing units (PPUs) or accelerators, such as a deep learning accelerator, and/or the like. Memory 116 of the respective servers and/or machines may store executable codes, libraries, and various dependencies of one or more models that are being trained or deployed thereon, e.g., TTS model 113, PM 114, PDM 115, and/or the like. In at least one embodiment, GPU 118 may include multiple cores, each core being capable of executing multiple GPU threads. One or more cores may run multiple threads concurrently (e.g., in parallel). In at least one embodiment, threads may have access to registers. One or more cores may include a scheduler to distribute computational tasks and processes among different threads of the respective core. A dispatch unit may implement scheduled tasks on appropriate threads using various private registers and shared registers. In at least one embodiment, GPU 118 may have a (high-speed) cache, access to which may be shared by multiple cores (e.g., all cores). Furthermore, GPU 118 may include or have access to a GPU memory in which GPU 118 may store intermediate and/or final results (outputs) of various computations performed by GPU 118.

Figure 2A:
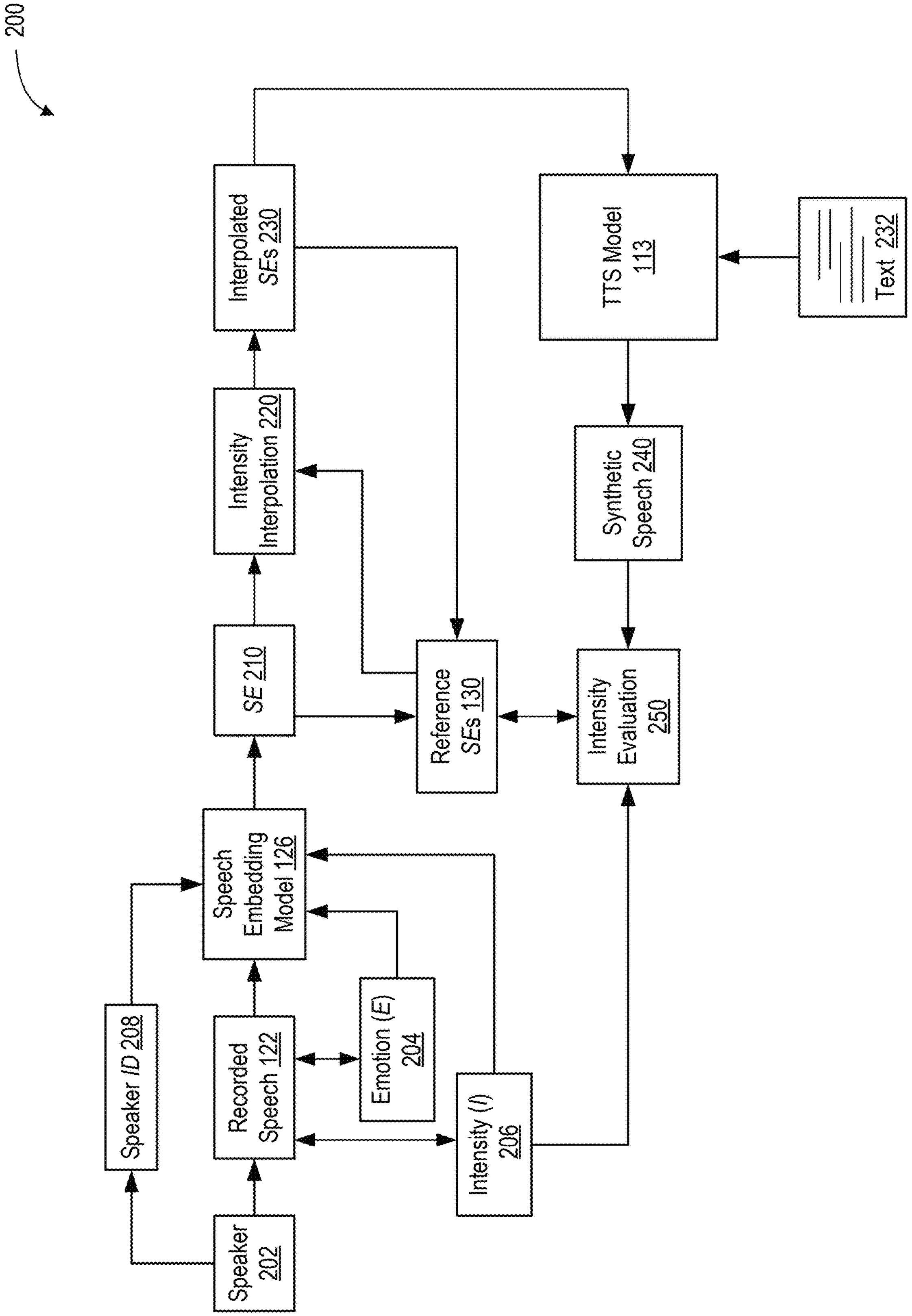
FIG. 2A illustrates an example data flow that may be used for generating speech embeddings that facilitate flexible emotion control in text-to-speech processing, according to at least one embodiment.

FIG. 2A illustrates an example data flow 200 that may be used for generating speech embeddings that facilitate flexible emotion control in text-to-speech processing, according to at least one embodiment. Operations illustrated in FIG. 2A may be performed by audio data processing server 120, in one embodiment. A human speaker 202 may produce a speech that is recorded (recorded speech 122) for processing by a speech embedding model 126. Speaker 202 may be an actor (e.g., professional, semi-professional, amateur actor, etc.) or some other expert in producing a speech with the desired level of emotion. In some embodiments, speaker 202 may be a layperson. Speaker 202 may be tasked with producing recorded speech 122 while expressing a specific emotion E 204 that is of interest in target applications, e.g., sadness, excitement, joy, skepticism, disbelief, surprise, sarcasm, enthusiasm, fear, compassion, and/or some other human emotion. Speaker 202 may further be tasked to produce the recorded speech 122 with a specific target intensity 206 of emotion E, e.g., a high H level of emotion E 204. Speaker 202 may also be tasked with recording an additional speech in a neutral N voice, e.g., a calm, business-like, matter-of-fact voice, and/or similarly emotionless voice.

Recorded speech 122 may be represented in any suitable digital format, e.g., in a raw audio data format or in a spectrogram (e.g., mel-spectrogram) representation. Spectrograms may capture a suitable sliding window of the recorded speech 122, with overlapping sliding windows processed as successive inputs into speech embedding model 126. Speech embedding model 126 embeds various characteristics of input speech in a multi-dimensional embedding space, e.g., 128-dimensional space, or a space of any other number M of dimensions. Correspondingly, speech embedding vectors or, simply, speech embeddings (SEs) 210 generated by speech embedding model 126 may have M components, e.g., components having integer values or floating-point values. Speech embeddings can be considered as points in the M-dimensional embedding space. The dimensionality M of the embedding space (defined as part of speech embedding model 126 architecture) may be smaller than the size of the input spectrograms. During training, speech embedding model 126 learns to associate similar speech characteristics with speech embeddings represented by points closely situated in the embedding space and further learns to associate dissimilar speech characteristics with points that are located farther apart in that space.

The characteristics of the speech may include a pitch frequency, rhythm, cadence (speed) of the speech, duration and pronunciation of various units (e.g., phonemes, words, sub-words, etc.) of speech, timbre, and/or the like. Speech embedding model 126 may have any suitable architecture, e.g., convolutional neural network (CNN) architecture, long short-term memory (LSTM) architecture, transformer architecture, conformer architecture, or some other attention-based architecture.

In some embodiments, additional inputs into speech embedding model 126 may include an identification of one or more emotions 204. For brevity and conciseness, the instant disclosure may refer to a single emotion E, but substantially the same or similar techniques may be used for control of multiple emotions. In some embodiments, inputs into speech embedding model 126 may include intensity levels I for various emotions E. For conciseness, emotion intensity levels are often referred to as intensities herein. In some embodiments, speaker identification (ID) 208 may be used as an additional input into speech embedding model 126. In other embodiments, speaker ID 208 may be used as an index for the speech embedding 210.

Speech embeddings SE(ID,E,I) generated by speech embedding model 126 may include speech embedding 210 of multiple intensities I, including neutral intensity I=N speech embedding, SE(ID,N,-), and at least one speech embedding generated using non-neutral emotion 204. In one example, a high intensity I=H speech embedding SE(ID,E,H) may be generated. In some embodiments, speech embeddings 210 of more than one non-neutral emotion 204 may be generated using corresponding recorded speech 122.

Speech embeddings 210 generated using recorded speech 122 may be used by intensity interpolation module 220 to generate one or more additional interpolated speech embeddings 230. For example, high intensity speech embedding SE(ID,E,H) and neutral speech embedding SE(ID,N,-) may serve as reference speech embeddings 130. In some embodiments, intensity interpolation 220 may include combining two (or more) reference speech embeddings 130. For example, a medium intensity embedding I=M may be obtained as a combination, of the high intensity embedding and the neutral embedding, $$SE(ID, E, M) = \frac{1}{2}[SE(ID, E, H) + SE(ID, N, -)].$$

A viability of the interpolated medium intensity speech embedding SE(ID,E,M) may then be tested using TTS model 113. A suitably selected text 232 and the generated speech embedding may be used an input into TTS model 113 to generate synthetic speech 240, $$TTS(\text{text } 232;\, SE(ID, E, M)) \rightarrow \text{Synthetic speech } 240.$$

The generated synthetic speech 240 may undergo intensity evaluation 250, which may be performed, e.g., by a human listener. Intensity evaluation 250 may determine a degree of emotion E present in synthetic speech 240.

In those instances where intensity evaluation 250 determines that synthetic speech 240 indeed corresponds to the medium intensity of emotion E, the medium intensity embedding SE(ID,E,M) may be added to reference speech embeddings 130.

In those instances where intensity evaluation 250 determines that synthetic speech 240 does not appropriately convey the medium intensity of emotion E, speaker 202 may record the same text 232 (or some other sample text) with the medium intensity of emotion E. The corresponding recorded speech 122 may then be processed by speech embedding model 126 to generate a replacement for the embedding SE(ID,E,M). The replacement embedding SE(ID,E,M) may then be added to reference speech embeddings 130. This process may continue until a target number K of reference speech embeddings 130 is obtained with a target granularity of emotion intensity.

In some instance, intensity evaluation 250 may determine that synthetic speech 240 does not appropriately convey the medium intensity of emotion E, but conveys an intensity that is lower than the medium intensity, e.g., I=0.4, or higher than the medium intensity, e.g., I=0.6. In such instances, the corresponding interpolated speech embedding 230 may still be added to reference speech embeddings 130 tagged with the corresponding intensity, even though the intensity is different from the original target (medium) intensity, I=0.5.

Figure 2B:
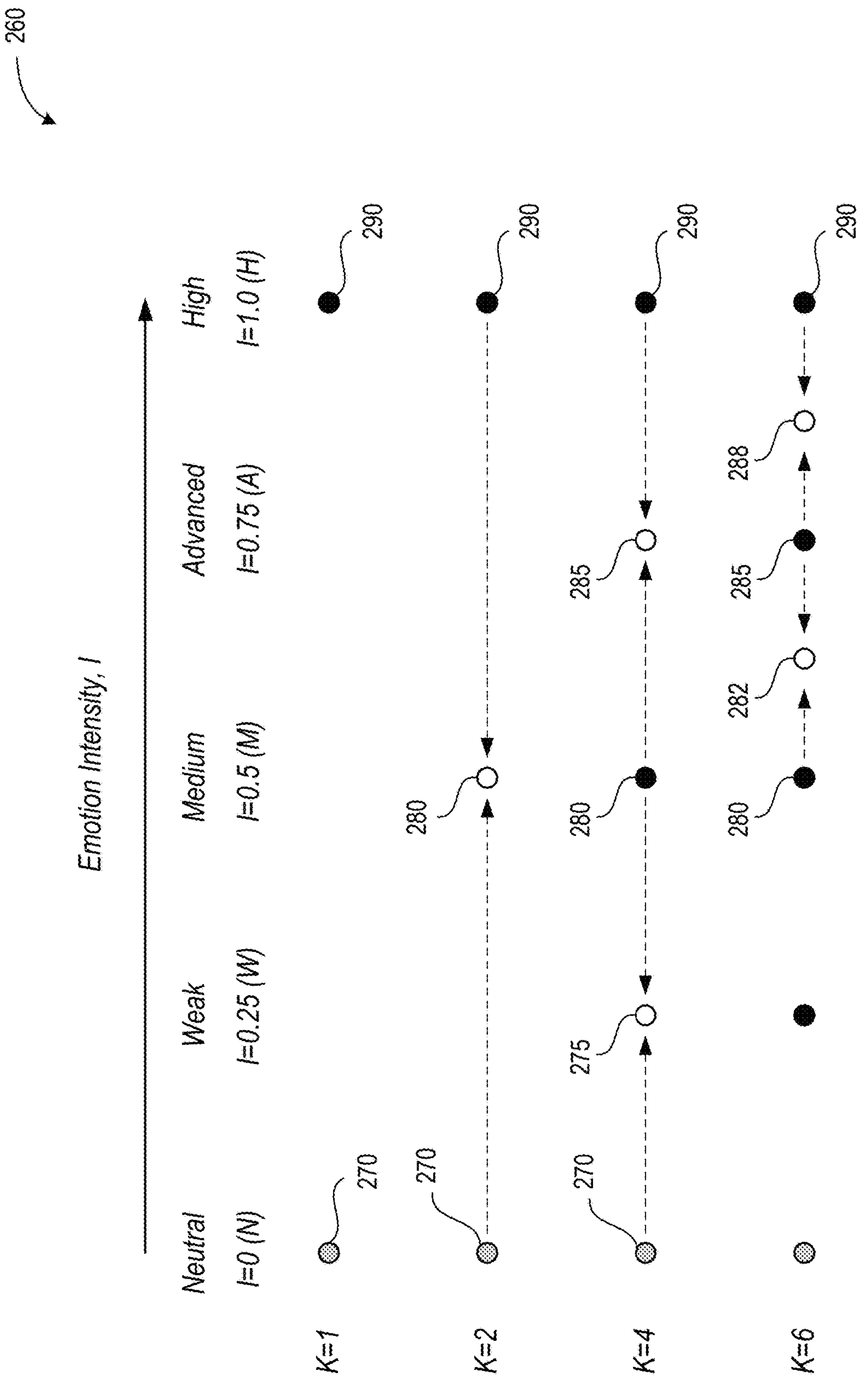
FIG. 2B illustrates generation of a set of reference (anchor) speech embeddings for facilitation of flexible emotion control in text-to-speech processing, according to at least one embodiment.

FIG. 2B illustrates generation 260 of a set of reference (anchor) speech embeddings for facilitation of flexible emotion control in text-to-speech processing, according to at least one embodiment. The horizontal axis depicts schematically emotion intensity I ranging from I=0 (Neutral) to I=1.0 (High). Initially, a neutral speech embedding SE(ID,N,-) 270 (depicted schematically with a gray circle) and a high intensity speech embedding SE(ID,E,H) 290 (depicted schematically with a black circle), corresponding to the K=1 level (indicative of one generated non-neutral speech embedding) are generated. Both speech embeddings of the K=1 level may be generated using a speech uttered by a human speaker.

At the next K=2 level, as depicted schematically with the horizontal dashed arrows, a speech embedding SE(ID,E,M) 280 (depicted with a white circle) associated with medium emotion intensity I=0.5 may be interpolated using the neutral speech embedding 270 and the high intensity speech embedding 290. The interpolated speech embedding may be maintained or replaced with an embedding generated using a human speaker, e.g., as disclosed in conjunction with FIG. 2A.

At the K=4 level, a speech embedding SE(ID,E,W) 275 associated with weak emotion intensity I=0.25 may be interpolated using the neutral speech embedding 270 and the medium intensity speech embedding 280. Similarly, a speech embedding SE(ID,E,A) 285 associated with advanced emotion intensity I=0.75 may be interpolated using the medium intensity speech embedding 280 and the high intensity speech embedding 290.

The described process may continue to generate any target number K of speech embeddings. For example, at the K=6 level, a speech embedding SE(ID,E,MA) 282 associated with medium-advanced emotion intensity I=0.62 may be interpolated using the medium intensity speech embedding 280 and the advanced intensity speech embedding 280. A speech embedding SE(ID,E,AH) 288 associated with advanced-high emotion intensity I=0.87 may be interpolated using the advanced intensity speech embedding 285 and the high intensity speech embedding 290.

In various embodiments, any suitable target number K of the reference speech embeddings may be obtained (interpolated and/or generated using human speech). The number K may be limited by an ability of a human speaker to produce progressively finer differentiations of the emotion intensities $I_j$ or an ability of a human listener to distinguish such progressively finer differentiations.

Figure 3A:
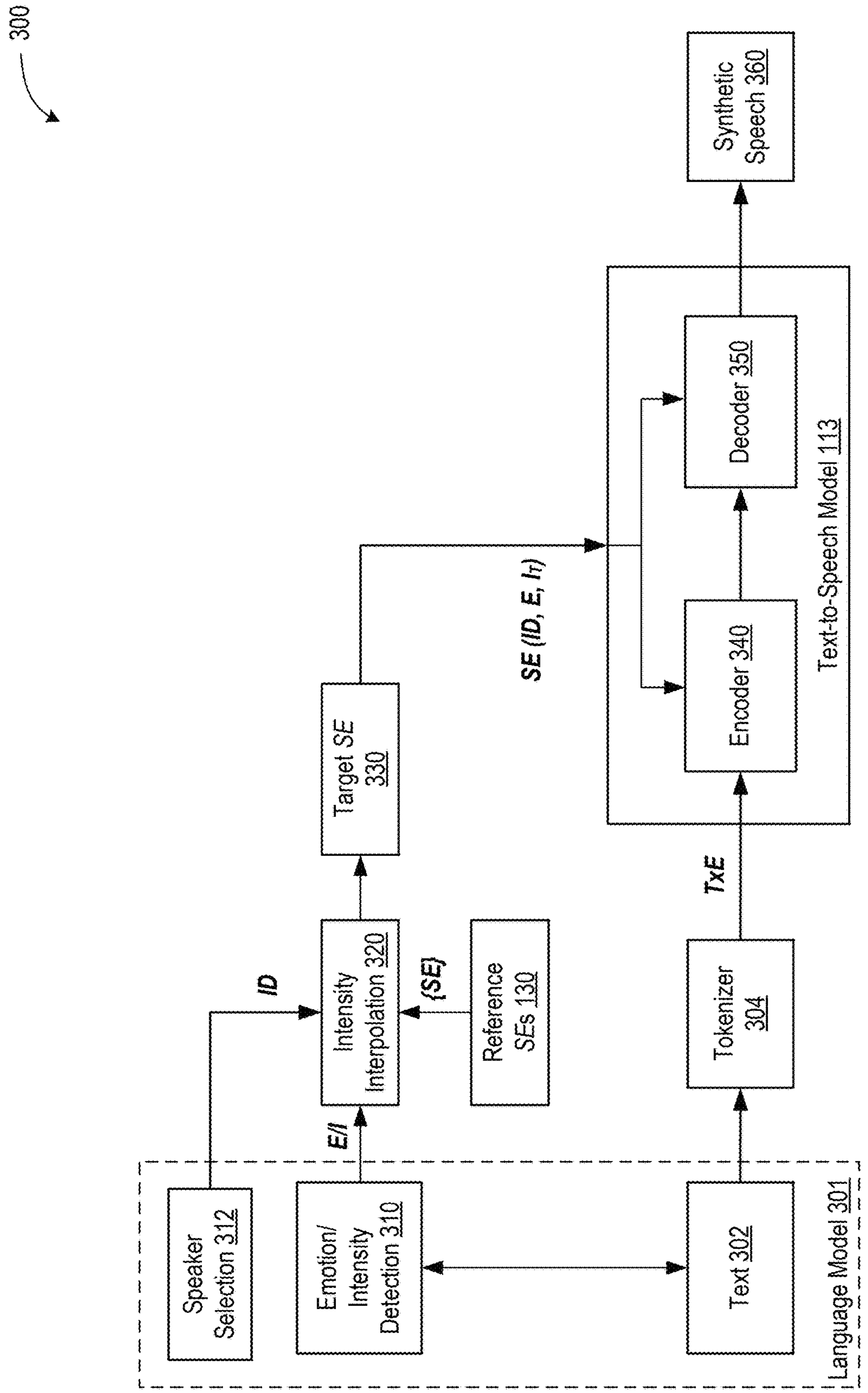
FIG. 3A illustrates an example data flow that may be used for generating synthetic speech using reference speech embeddings, according to at least one embodiment.

FIG. 3A illustrates an example data flow 300 that may be used for generating synthetic speech using reference speech embeddings, according to at least one embodiment. Reference speech embeddings, generated using techniques disclosed in conjunction with FIG. 2A and FIG. 2B, may be used to generate speech of a target emotion intensity. FIG. 3A illustrates generation of synthetic speech 360 that includes a spoken version of text 302. Text 302 may be associated with a specific target emotion intensity $I_T$, determined or set by an emotion/intensity (E/I) determination module 310. In some embodiments, E/I determination module 310 may be a part of a language model 301 (which may be a large language model, LLM) that generates text 302 (e.g., a response to a user's utterance) together with identifying the types of one or more emotions and the target intensities of those emotions. In some embodiments, E/I determination module 310 may be a part of a computer game that generates text 302, e.g., as part of the game narrative and/or words spoken by one or more game NPCs.

The target intensity $I_T$ may be selected between the neutral intensity I and the maximum (high) intensity I=1 (or even above the maximum intensity, as disclosed below). For the sake of definiteness, the neutral intensity is associated with the value I=0 and the maximum intensity is associated with value I=1, but any other intensity scale consistent with the intensity scale used in generation of reference speech embeddings 130 (e.g., as part of operations of FIG. 2A) may also be used. The target intensity $I_T$ may have continuous values or any set of discrete values (bins).

Target intensity $I_T$ and reference speech embeddings 130 may be used as an input into an intensity interpolation module 320, which generates a target speech embedding 330 corresponding to the target intensity $I_T$. Speaker selection 312 may provide, as an additional input to intensity interpolation module 320, a speaker identification ID, e.g., in the instances where reference speech embeddings 130 have been generated for multiple speakers.

In some embodiments, intensity interpolation module 320 may select two or more reference speech embeddings 130, e.g., a pair of reference intensities $I_j$ and $I_{j+1}$ that are the closest to the target intensity $I_T$. The identified pair of speech embeddings SE(ID,E,$I_j$) and SE(ID,E,$I_{j+1}$) may be used to generate the target embedding SE(ID,E,$I_T$) with the two selected embeddings taken with weights that depend on the relative distances between intensities $I_j$ and $I_{j+1}$ and the target intensity $I_T$:

$$SE(ID, E, I_T) = \frac{I_{j+1} - I_T}{I_{j+1} - I_j} \times SE(ID, E, I_j) + \frac{I_T - I_j}{I_{j+1} - I_j} \times SE(ID, E, I_{j+1}).$$

In some embodiments, this formula may be applied to a situation where target intensity $I_T$ exceeds the reference intensities, including intensities of all reference speech embeddings, e.g., $I_T>1$. In such instances, the above formula implements extrapolation of the speech embeddings outside the region where the reference speech embeddings were originally defined. (Extrapolation implies that one of the embeddings is taken with a weight that is greater than unity, $$\frac{I_T - I_j}{I_{j+1} - I_j} > 1,$$

while the other weight is negative $$\frac{I_{j+1} - I_T}{I_{j+1} - I_j} < 0,$$

even though the two weights still add up to 1.)

In some embodiments, more than two closest reference speech embeddings, e.g., all K reference speech embeddings, may be used:

$$SE(ID, E, I_T) = \frac{1}{\sum_{j=0}^{K} |I_T - I_j|^{-1}} \times \sum_{j=0}^{K} \frac{SE(ID, E, I_j)}{|I_T - I_j|},$$

where the j=0 term corresponding to the neutral speech embedding and the j=K term corresponding to the highest available intensity.

In some embodiments, the sum in the above formula may be taken over any suitable subset of K reference embeddings, e.g., K' reference speech embeddings corresponding to K' closest (to $I_T$) intensities $I_j$.

In some embodiments, a non-linear interpolation (or extrapolation) may be used instead of the linear interpolation illustrated with the above examples. In particular, spline interpolation may be used. In some embodiments, polynomial interpolation may be used, e.g., a polynomial of degree K may be defined, $$SE(ID, E, I_T) = \sum_{j=0}^{K} S_j (I_T)^j,$$

with K+1 vector coefficients $S_j$ determined from K+1 conditions, $$\sum_{k=0}^{K} S_k (I_j)^k = SE(ID, E, I_j),$$

where j taken values 0, 1, . . . K.

The target speech embedding SE(ID,E,$I_T$) associated with the target level $I_T$ of emotion E may be used as an input into TTS model 113 that generates synthetic speech 360, e.g., an audio file of text 302 pronounced by speaker ID with the target emotion intensity $I_T$.

In some embodiments, prior to inputting into TTS model 113, text 302 may be processed by tokenizer 304 that generates a text embedding (TxE), which may be any digital representation of text 302 encoding various words and punctuation marks of text 302 into tokens recognizable by TTS model 113. For example, text embedding TxE may include a set of tokens, with individual tokens encoding specific alphanumeric symbols of text 302, such as a letter, a number, a word, a sub-word, a symbol, a glyph, and so on, according to any language in which speech synthesis is being performed. Some of the tokens of text embedding TxE may encode spaces and punctuation marks of text 302. Different text embeddings TxE may correspond to a particular number of symbols or words of training text. In some embodiments, individual text embeddings TxE may correspond to individual intervals of synthetic speech 360 that corresponds to text 302.

TTS model 113 may have any suitable architecture, e.g., a neural network architecture that includes multiple layers of neurons, which may be joined in blocks of layers having a similar functionality. The neural network(s) of TTS model 113 may include convolutional layers, fully connected layers, linear layers, dropout layers, normalization layers, and/or the like. In some embodiments, TTS model 113 may have an encoder-decoder architecture. More specifically, encoder 340 may be responsible for contextual understanding of text 302 including extracting relevant language information contained in text 302. Encoder 340 generates an intermediate output (feature vector, embedding) that is passed on to decoder 350. Decoder 350 processes the intermediate output, which encodes relevant information of text 302 and produces a suitable representation (e.g., spectrograms) of synthetic speech 360 using the target speech embedding 330, which encodes desired speech characteristics of the speaker selected by speaker selection 312.

In some embodiments, encoder 340 and/or decoder 350 may be (or include) a transformer-type network(s) with multiple transformer blocks. The transformer blocks may use an attention mechanism to capture context of input text 302. Transformer blocks may further include normalization layers, feed-forward layers, skipped connections, and/or the like. In some embodiments, encoder 340 and/or decoder 350 may include one or more conformer blocks, e.g., blocks that combine the convolutional architecture with the transformer architecture.

In some embodiments, input into encoder 340 includes the target speech embedding 330. In some embodiments, the target speech embedding 330 is inputted into decoder 340 but not into encoder 340. In some embodiments, the target speech embedding 330 is inputted into both encoder 340 and decoder 350.

Figure 3B:
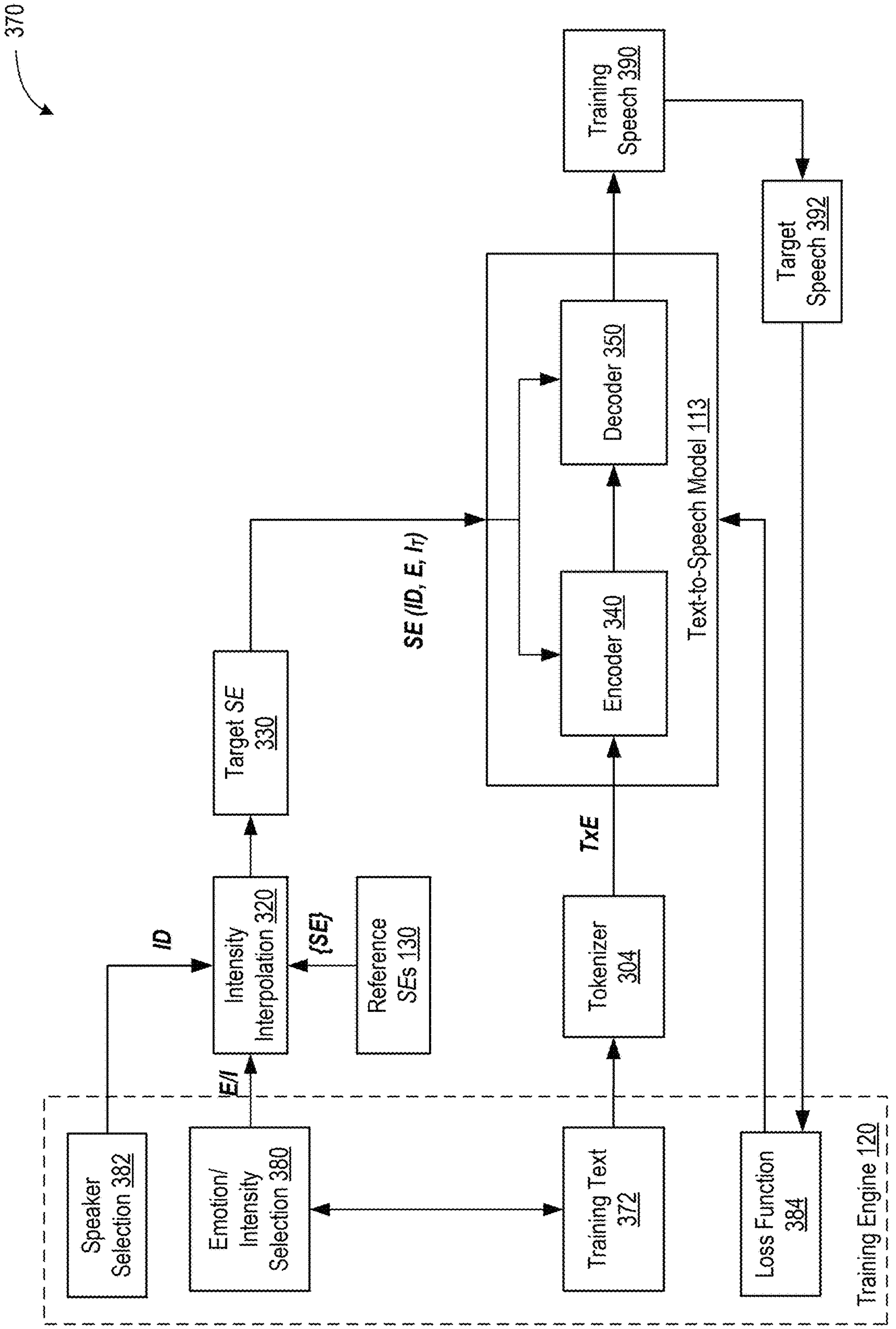
FIG. 3B illustrates an example data flow of training a TTS model to generate synthetic speech using reference speech embeddings, according to at least one embodiment.

FIG. 3B illustrates an example data flow 370 of training a TTS model to generate synthetic speech using reference speech embeddings, according to at least one embodiment. In some embodiments, data flow 370 may be facilitated by training engine 112 of training server 110 (with reference to FIG. 1) that trains a suitable TTS model, e.g., TTS model 113. TTS model 113 may be an autoregressive TTS model, a parallel TTS model, a generative TTS model, and/or so on. At the start of training, training engine 112 may initialize TTS model 113 by defining a neural network architecture of TTS model 113, including a number of neuron layers, blocks of layers, a number of nodes (neurons) in various neuron layers, the types of layers, e.g., convolutional layers, linear layers, dropout layers, normalization layers, etc., a number, dimensions, and stride of filters deployed by convolutional layers, types of activations functions used in different layers, and so on. The initialized TTS 113 may have parameters (e.g., weights and biases) that are assigned some starting values, e.g., fixed values or values randomly seeded by training engine 112.

During training of TTS model 113, training engine 112 may select a training input and apply the TTS model 113 to the selected training input to generate a training output. More specifically, training input may include training text 372 and training output may include generated training speech 390 that includes a spoken version of training text 372. Training engine 112 may select training text 372 in conjunction with a specific emotion E and level of intensity I, which may be selected, e.g., randomly, by E/I selection module 380. Additionally, speaker selection module 382 of training engine 112 may select a speaker. In some embodiments, speaker selection may also be performed randomly, e.g., from a list of speakers used to generate reference speech embeddings 130 (e.g., as disclosed in conjunction with FIGS. 2A-2B).

Training (synthetic) speech 390 may be generated using training text 372 and target speech embedding 330, which may be generated for the selected speaker ID, emotion E, target intensity $I_T$, and reference speech embeddings 130, e.g., substantially as disclosed in conjunction with the inference processing of FIG. 2A.

Subsequently, training engine 112 may evaluate a difference between training speech 390 and a target speech 392 (ground truth) using a suitable loss function 384. The difference may be backpropagated through TTS model 113 (e.g., using gradient descent techniques), and the weights and biases of TTS model 113 may be adjusted to cause evolution of the training speech 390 to more closely resemble the target speech 392. Such adjustments may be repeated over any number of iterations, epochs, etc., until the difference between the training speech and the target speech satisfies a predetermined condition (e.g., falls below a predetermined value, converges to an acceptable level of accuracy, etc.). Subsequently, a different training text 372 may be selected, a new training speech 390 generated, and a new series of adjustments implemented until TTS model 113 is trained to a target degree of accuracy.

Figure 4:
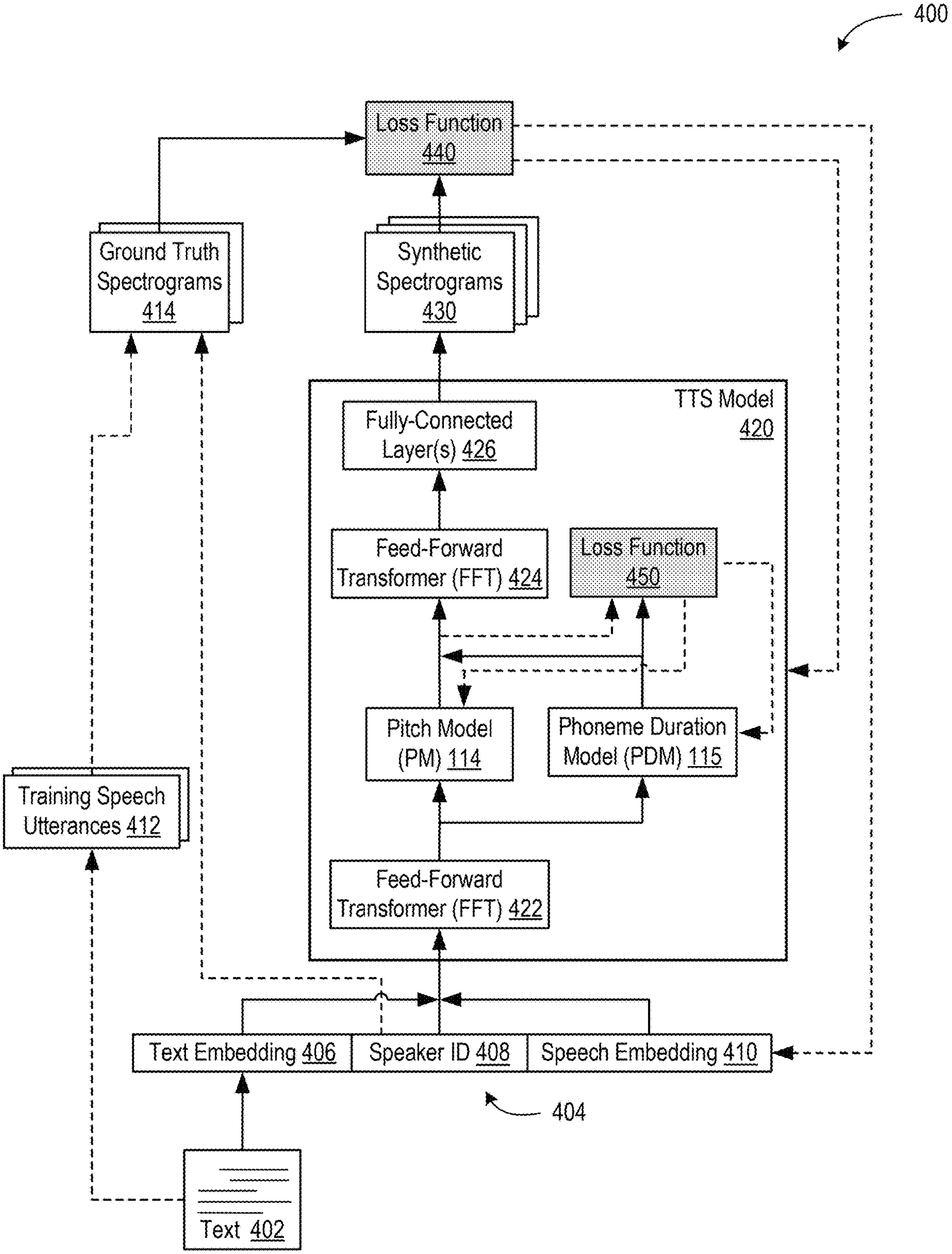
FIG. 4 illustrates one example architecture and operations of a TTS model that generates synthetic speech using target speech embeddings, according to at least one embodiment, according to at least one embodiment.

FIG. 4 illustrates one example architecture 400 and operations of a TTS model 420 that generates synthetic speech using target speech embeddings, according to at least one embodiment, according to at least one embodiment. The operations indicated with solid arrows may be performed both in training and inference. The operations indicated with dashed arrows may be performed in training and not in inference. Blocks indicated with shading may be used in training and not used in inference. TTS model 420 illustrated in FIG. 4 may be TTS model 113 described in conjunction with FIGS. 2A-2B and FIGS. 3A-3B or some other similar TTS model. Even though TTS model 420 in FIG. 4 has a feed-forward architecture, this is intended as an illustration and not a limitation. Various other model architectures may also be used, e.g., the encoder-decoder architecture of FIG. 3A-3B, in one example.

In some embodiments, an input 404 into TTS 420 may include a text embedding 406, which may be any digital representation of text 402, e.g., a set of tokens encoding alphanumeric symbols, punctuation marks, images, and/or any other objects of text 402. In some embodiments, input 404 may include a speaker ID 408. In training, speaker ID 408 may be any label uniquely identifying a speaker that generated training speech utterance(s) 412 associated with text 402. In inference, speaker ID 408 may be an identification of a target speaker whose voice and speech characteristics are to be emulated with the generated synthetic speech.

Input 404 may further include a speech embedding 410 that encodes speech features of a particular speaker identified by speaker ID 408. In some instances, speech embedding 410 may be a reference speech embedding 130 generated using recorded speech 122 produced by the corresponding speaker (with reference to FIG. 2A) or an interpolated speech embedding 230 produced by interpolating one or more reference speech embeddings 130 (e.g., as disclosed in conjunction with FIG. 2A and or FIG. 2B). Speech embedding 410 may be a digital string (vector) of a predetermined length M, e.g., a 128-bit vector, a 192-bit vector, a 256-bit vector, a 512-bit vector, and/or the like. In some embodiments, speech embeddings 410 may be represented collectively as a suitable combination of individual speech embeddings, e.g., as an N×M embeddings matrix with speaker IDs 408 enumerating various partitions (e.g., rows) of the embedding matrix associated with N individual speakers.

In some embodiments, speech embedding(s) 410 may be generated by a separate external model (e.g., speech embedding model 126). In such embodiments, speech embedding (s) 410 may be unchanged in the course of training of TTS model 420. In other embodiments, training engine 112 may modify speech embedding(s) 410 as part of the training of TTS model 420, to improve representation of speech features of a particular speaker by the corresponding (to that speaker) speech embedding(s) 410. In some implementations, multiple embeddings associated with a given speaker (including reference speech embeddings 130) may be modified during training of TTS model 420.

TTS model 420 may process input 404 to generate synthetic spectrograms 430 that approximate speech and voice features of a speaker identified by speaker ID 408 pronouncing text 402. TTS model 420 may have numerous possible architectures. By way of example and not limitation, TTS model 420 may include one or more feed-forward transformers (FFTs), e.g., FFT 422 and FFT 424. Each of the FFTs may have a stack of feed-forward layers with a transformer architecture having one or more multi-head attention blocks, several layers of one-dimensional (1D) convolutions, pooling and/or normalization layers, and/or other layers. The attention blocks facilitate association of various phonemes of the speech being generated with correct units (words, syllables, sounds, etc.) of text embedding 406.

An output of FFT 422 may be processed by PM 114 and PDM 115. In some embodiments, processing by PM 114 and PDM 115 may be performed in parallel. PM 114 may determine low-level speech characteristics for pronunciation of various phonemes of the synthetic speech. The low-level characteristics may include a fundamental frequency (pitch) used during pronunciation of the respective phoneme. In some embodiments, the low-level characteristics may further include energy (volume) of the synthetic speech for various phonemes. PDM 115 may determine correct durations for various phonemes of the synthetic speech. In some embodiments, PM 114 and/or PDM 115 may include multiple layers (or sets of layers) of 1D convolutions, one or more fully connected layers, and/or other layers of neurons.

Processing by PM 114 and PDM 115 may transform a hidden representation output by FFT 422 into a set of predicted pitch values, $\{p_j\}=p_1, p_2, \ldots, p_t$ and a corresponding set of durations $\{d_j\}=d_1, d_2, \ldots, d_t$. The outputs of PM 114 and PDM 115 may be jointly processed by FFT 424. One or more fully-connected layers 426 may determine synthetic spectrograms 430, $\{f_j\}=f_1, f_2, \ldots, f_t$, for various time frames of synthetic speech. Synthetic spectrograms 430 may be compared with ground truth spectrograms 414, $$\{f_j^{GT}\} = f_1^{GT}, f_2^{GT}, \ldots, f_t^{GT},$$

using a suitable loss function 450. In some embodiments, the loss function may be the mean-squared error loss function, $$L = \sum_{j=1}^{t} (f_j - f_i^{GT})^2,$$

or some other suitable loss function, including but not limited to the mean absolute error loss function, mean-squared logarithmic error loss function, Huber loss function, and/or any other loss functions, or a combination thereof.

As indicated with the dashed arrows in FIG. 4, the computed value of the loss function 440 may be backpropagated through various layers and neurons of TTS model 420 and the parameters (weights and biases) of TTS model 420 may be adjusted to minimize (or reduce) the output of loss function 440. In some embodiments, speech embeddings 410 may be modified to further reduce the value of loss function 440. This teaches TTS model 420 to generate realistic synthetic speech spectrograms 430 and may simultaneously condition speech embeddings 410 to correctly approximate speech of the real speakers (in the instance of learned speech embeddings 410).

In some embodiments, additional losses associated with imprecise determination of pitch values and/or phoneme durations may be separately evaluated using an additional loss function 450. A ground truth data for the loss function may include target pitch values $$\{p_j^{GT}\} = p_1^{GT}, p_2^{GT}, \ldots, p_t^{GT}$$

and target phoneme durations $$\{d_j^{GT}\} = d_1^{GT}, d_2^{GT}, \ldots, d_t^{GT},$$

which may be determined, e.g., from ground truth spectrograms 414. In some embodiments, loss function 450 may be used (e.g., as illustrated with the corresponding dashed arrows) to train PM 114 and/or PDM 115. In some embodiments, PM 114 and PDM 115 may be trained independently using separate loss functions.

Figure 5:
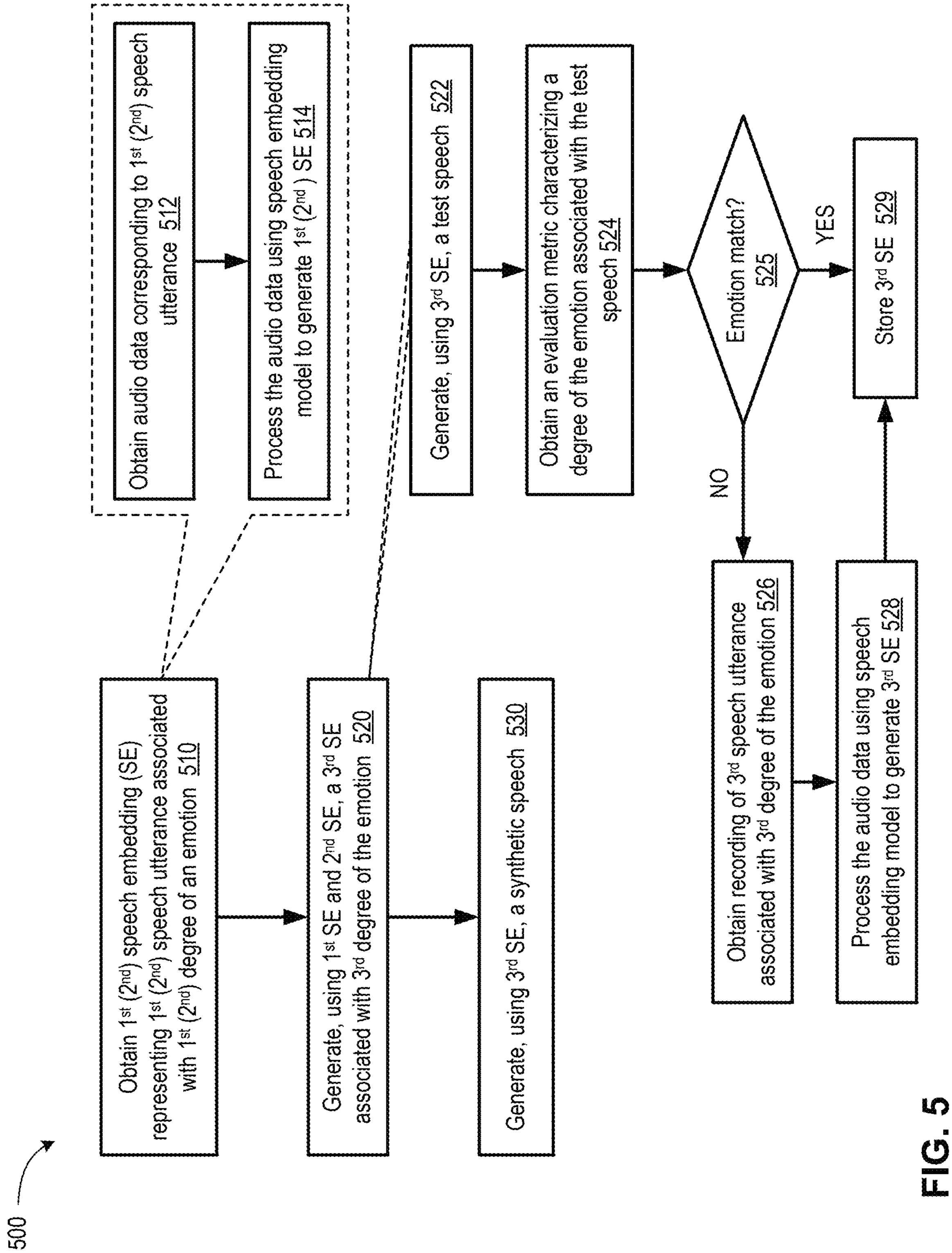
FIG. 5 is a flow diagram illustrating a method of generating reference speech embeddings that facilitate flexible emotion control in text-to-speech processing, according to at least one embodiment.
Figure 6:
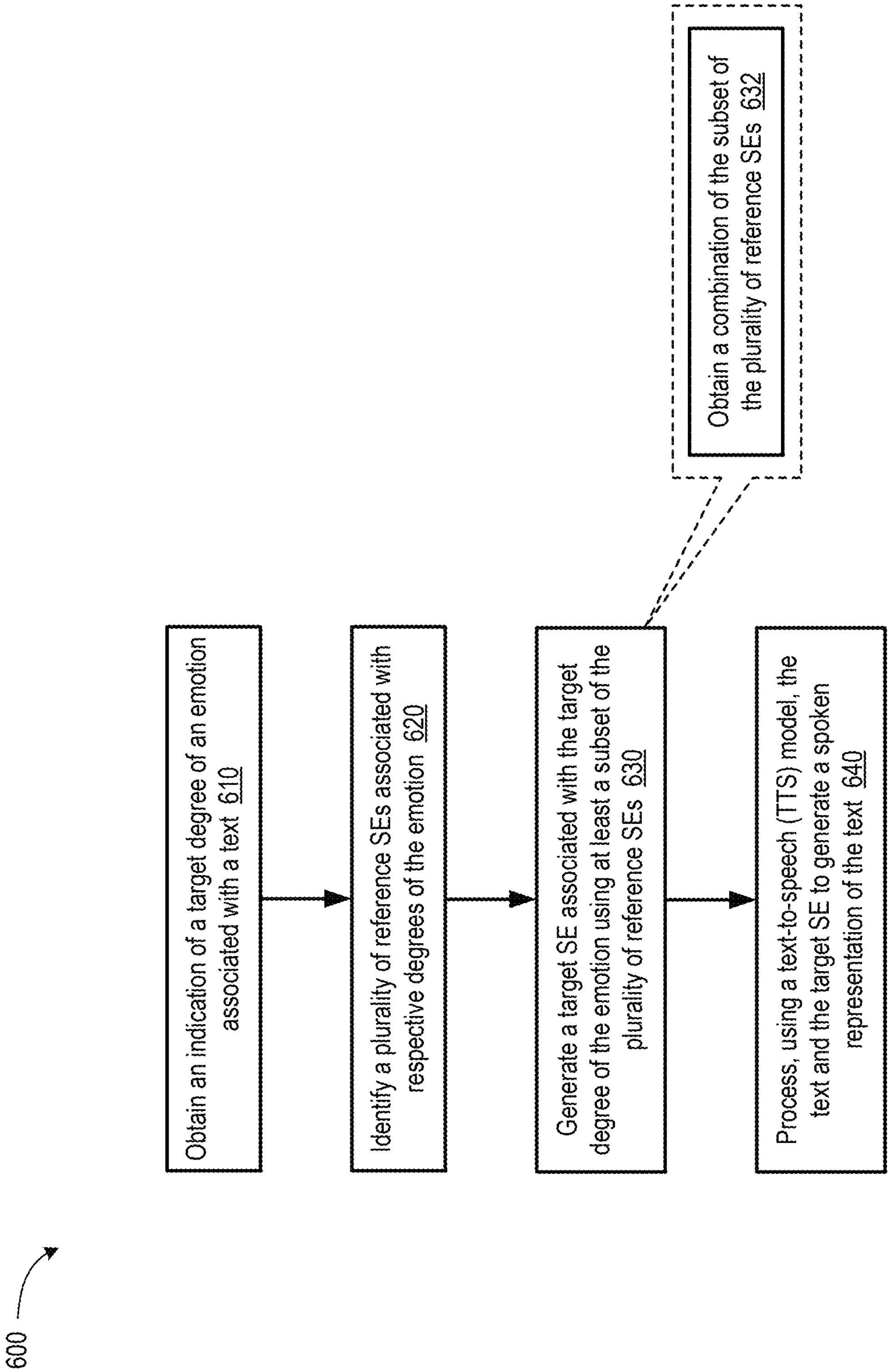
FIG. 6 is a flow diagram illustrating a method of using reference speech embeddings to implement flexible emotion control in text-to-speech processing, according to some embodiments of the present disclosure.

FIG. 5 and FIG. 6 are flow diagrams illustrating methods 500 and 600 of using reference speech embeddings that facilitate flexible emotion control in text-to-speech processing. Methods 500 and/or 600 may be performed using one or more processing units (e.g., CPUs, GPUs, accelerators, PPUs, DPUs, etc.), which may include (or communicate with) one or more memory devices. In at least one embodiment, methods 500 and/or 600 may be performed using processing units of audio data processing server 120, speech synthesis server 150, training server 110, and/or other suitable computing devices. In at least one embodiment, processing units performing methods 500 and/or 600 may be executing instructions stored on a non-transient computer-readable storage media. In at least one embodiment, methods 500 and/or 600 may be performed using multiple processing threads (e.g., CPU threads and/or GPU threads), individual threads executing one or more individual functions, routines, subroutines, or operations of the method. In at least one embodiment, processing threads implementing methods 500 and/or 600 may be synchronized (e.g., using semaphores, critical sections, and/or other thread synchronization mechanisms). Alternatively, processing threads implementing methods 500 and/or 600 may be executed asynchronously with respect to each other. Various operations of methods 500 and/or 600 may be performed in a different order compared with the order shown in FIG. 5 and/or FIG. 6. Some operations of methods 500 and/or 600 may be performed concurrently with other operations. In at least one embodiment, one or more operations shown in FIG. 5 and/or FIG. 6 may not always be performed.

Methods 500 and/or 600 may be performed in the context of text-to-speech conversion and may involve speech utterances produced by people in any possible context, e.g., a conversation, a public speech, a public event, a business meeting, a conference, a street encounter, an interaction in a game, an interaction with a chat bot or digital avatar, an interaction with an in-vehicle infotainment system, and/or the like.

FIG. 5 is a flow diagram illustrating method 500 of generating reference speech embeddings that facilitate flexible emotion control in text-to-speech processing, according to some embodiments of the present disclosure. At block 510, one or more processing units executing method 500 may obtain a first speech embedding (SE) representing a first speech utterance associated with a first degree of an emotion, e.g., a high or strong emotion intensity, or some other emotion intensity. Similarly, operations of block 510 may include obtaining a second SE representing a second speech utterance associated with a second degree of the emotion, e.g., a neutral emotion intensity. Neutral emotion intensity may correspond to an absence of the emotion.

In some embodiments, as indicated with the top callout portion of FIG. 1, obtaining the first SE may include operations of block 510. More specifically, at block 512, method 500 may include obtaining an audio data corresponding to the first speech utterance associated with the first degree of the emotion. At block 514, method 500 may include processing the audio data using a speech embedding model to generate the first speech embedding (e.g., as disclosed in conjunction with FIG. 2A).

At block 520, method 500 may continue with generating, using the first speech embedding and the second speech embedding, a third speech embedding associated with a third degree of the emotion (e.g., as disclosed in conjunction with FIG. 2B). In some embodiments, the third degree of the emotion (e.g., I=M) is greater than the first degree of the emotion (e.g., I=N) and lesser than the second degree of the emotion (e.g., I=H). In some embodiments, generating the third speech embedding may include interpolating the first speech embedding and the second speech embedding to obtain the third speech embedding. In some embodiments, the third speech embedding may be a linear interpolation between the first speech embedding and the second speech embedding.

In some embodiments, as illustrated with the bottom callout portion of FIG. 5, generating the third speech embedding may include, at block 522, generating a test speech using the third speech embedding. For example, generating the test speech (e.g., synthetic speech 240 in FIG. 2A) may include processing, using a text-to-speech (TTS) model, a text of the test speech (e.g., text 232 in FIG. 2A) and the third speech embedding. At block 524, method 500 may continue with obtaining an evaluation metric characterizing a degree of the emotion associated with the test speech. In some embodiments, the evaluation metric may be a binary metric, indicating whether the emotion expressed in the test speech matches the third degree of emotion. In some embodiments, the evaluation metric may be a non-binary metric, indicative of a particular perceived degree of emotion.

At decision-making block 525, method 500 may include determining that the evaluation metric indicates that the degree of the emotion does not match the third degree of the emotion. Responsive to this determination, method 500 may include obtaining, at block 526, an audio data corresponding to a third speech utterance associated with the third degree of the emotion. The third speech utterance may be produced by a human speaker. Method 500 may continue, at block 528, with processing the audio data using a speech embedding model to generate a replacement speech embedding for the third speech embedding and storing, at block 529, the replacement speech embedding.

In those instances where the evaluation metric has indicated, at block 525, that the degree of the emotion associated with the test speech does match the third degree of the emotion, method 500 may continue with storing the third speech embedding.

At block 530, method 500 may include generating, using the third speech embedding, a synthetic speech (e.g., as disclosed in conjunction with FIG. 3A).

FIG. 6 is a flow diagram illustrating method 600 of using reference speech embeddings to implement flexible emotion control in text-to-speech processing, according to some embodiments of the present disclosure. At block 610, one or more processing units executing method 600 may obtain an indication of a target degree of an emotion associated with a text. In some embodiments, obtaining the indication of the target degree of the emotion may be performed together (e.g., in conjunction) with generating the text. For example, the text and the indication of the target degree of the emotion associated with the text may be generated by a language model, e.g., a large language model. In some embodiments, obtaining the indication of the target degree of the emotion may include detecting the degree of emotion (e.g., using a sentiment detection machine learning model) in an independently generated text.

At block 620, method 600 may include identifying a plurality of reference speech embeddings (SEs). An individual reference speech embedding of the plurality of reference speech embeddings may be associated with a respective degree of the emotion of a plurality of degrees of the emotion.

At block 630, method 600 may continue with generating a target speech embedding associated with the target degree of the emotion. The target speech embedding may be generated using at least a subset of the plurality of reference speech embeddings. In some embodiments, generating the target speech embedding may include performing operations of the callout block 632, e.g., obtaining a combination of a subset of the plurality of reference speech embeddings. Individual reference speech embeddings may be included in the combination with a weight that is determined based on the target degree of the emotion ($I_T$) and a corresponding degree of the emotion associated with the individual reference speech embedding $I_j$). In some embodiments, the subset of the plurality of reference SEs may include a first reference speech embedding associated with a first degree of the emotion that is lower than the target degree of the emotion, and may further include a second reference speech embedding associated with a second degree of the emotion that is greater than the target degree of the emotion.

At block 640, method 600 may include processing, using a TTS model, (i) the text and (ii) the target speech embedding to generate an audio of a speech comprising a spoken representation of the text. In some embodiments, the TTS model includes an encoder network and a decoder network, wherein an input into the encoder network includes the text and the target speech embedding. The input into the decoder network may include an output of the encoder network and the target speech embedding.

In some embodiments, operations of method 600 may be used to obtain synthetic speech with multiple emotions $E_1$, $E_2$, $E_3$, etc. For example, in the instances of two emotions, e.g., both sarcasm and joy, fear and sadness, and/or the like, method 600 may include, at block 610, obtaining both a first indication of a first target degree $I_{T1}$ of the first emotion $E_1$ associated with the text and an additional second indication of a second target degree $I_{T2}$ of a second emotion $E_2$ associated with the text. At block 620, method 600 may include identifying a first plurality of reference speech embeddings $\{SE(ID,E_1,I_{1j}); 0=1 \ldots K_1\}$ and further identifying a second plurality of reference speech embedding $\{SE(ID,E_2,I_{2j}); 0=1 \ldots K_2\}$. Both pluralities of speech embeddings may include a neutral speech embedding, e.g., as the j=0 term, $SE(ID,N,-)=SE(ID,E_1,I_{1,0})=SE(ID,E_2,I_{2,0})$, corresponding to the absence of the emotions. At block 630, method 600 may include generating a target speech embedding. The target speech embedding may be associated with both the first target degree $I_{T1}$ of the first emotion and the second target degree $I_{T2}$ of the second emotion. In some embodiments, the target speech embedding may include a combination of (i) a subset of the first plurality of reference speech embeddings and (i) the second subset of the second plurality of reference speech embeddings. An individual reference speech embedding of the first plurality of speech embeddings may be included in the combination with a weight that is based on at least (i) the first target degree $I_{T1}$ of the first emotion and (ii) a corresponding degree of the emotion $I_{1j}$ associated with the individual reference speech embedding. Similarly, an individual reference speech embedding of the second plurality of speech embeddings may be included in the combination with a weight that is based on at least (i) the second target degree $I_{T2}$ of the second emotion and (ii) a corresponding degree of the second emotion associated with the individual reference speech embedding.

Although the embodiments disclosed above were illustrated with mixing embeddings associated with the same speakers (and different emotions), in some embodiments, similar techniques may be used for mixing embeddings associated with different speakers.

The systems and methods described herein may be used for a variety of purposes, by way of example and without limitation, for performing one or more operations corresponding to a system that performs machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Inference and Training Logic

Figure 7A:
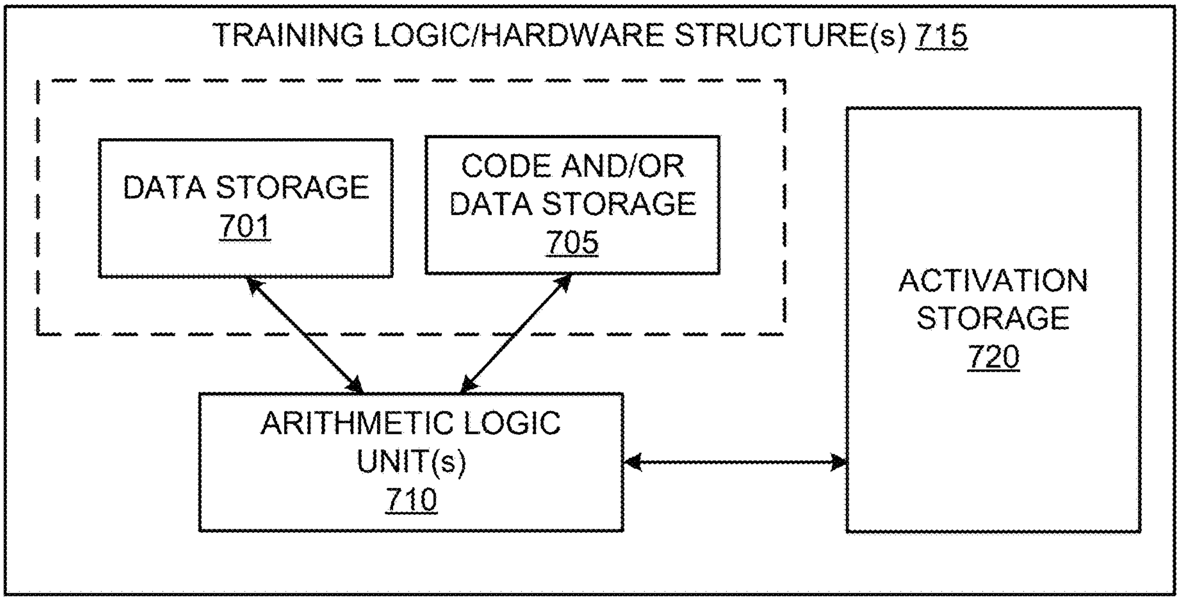
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
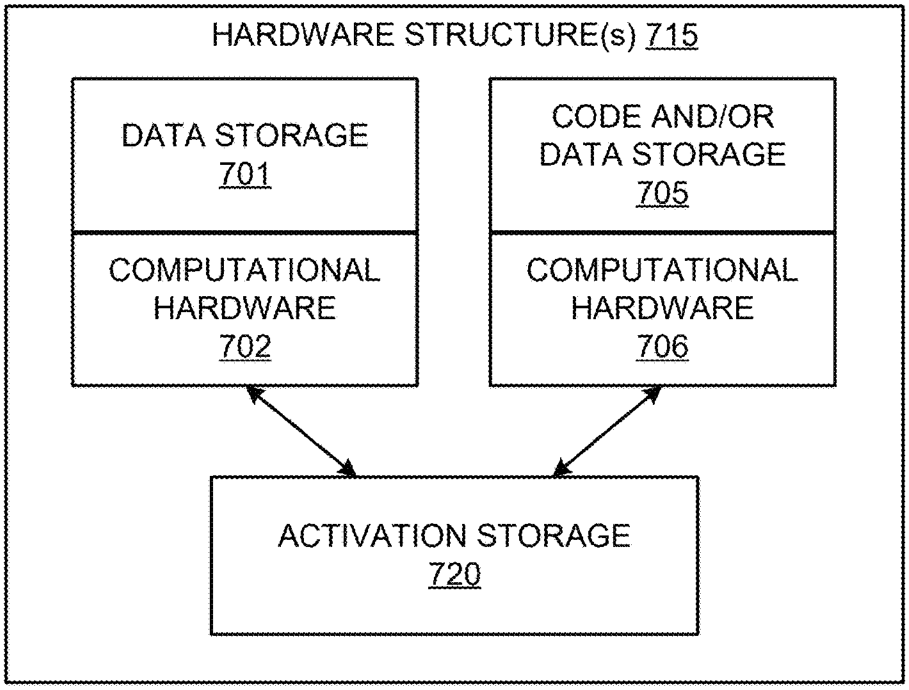
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
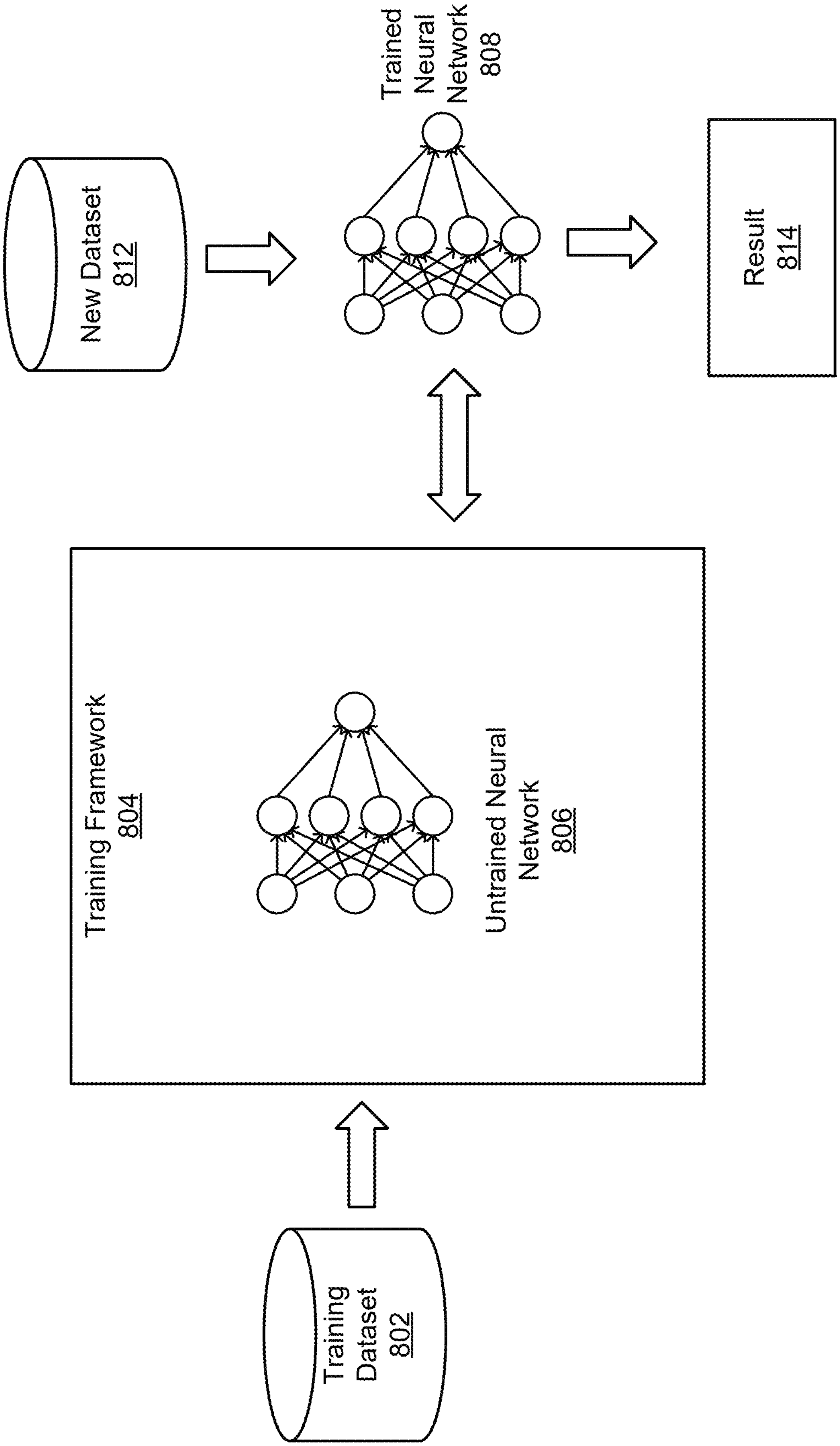
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
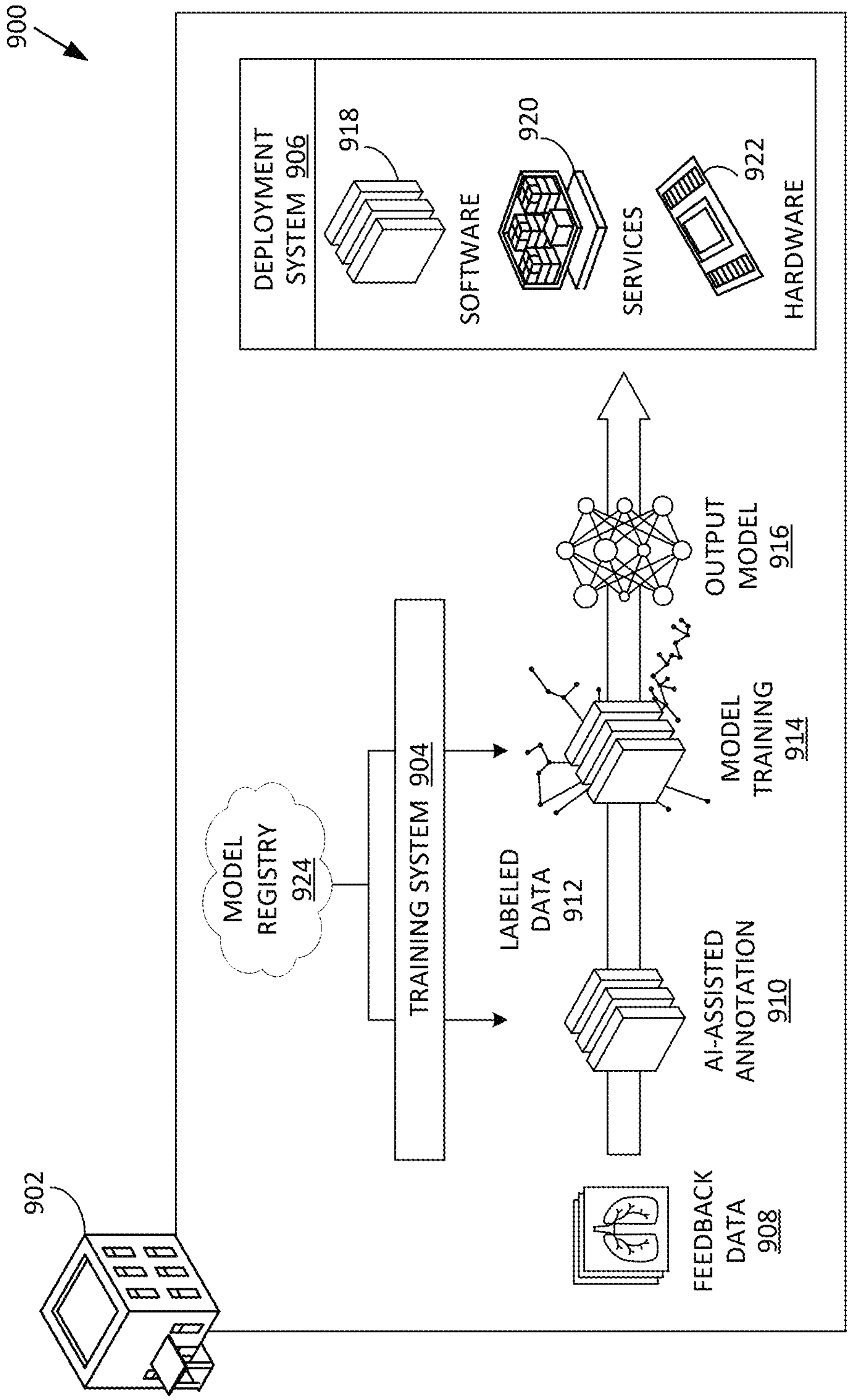
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
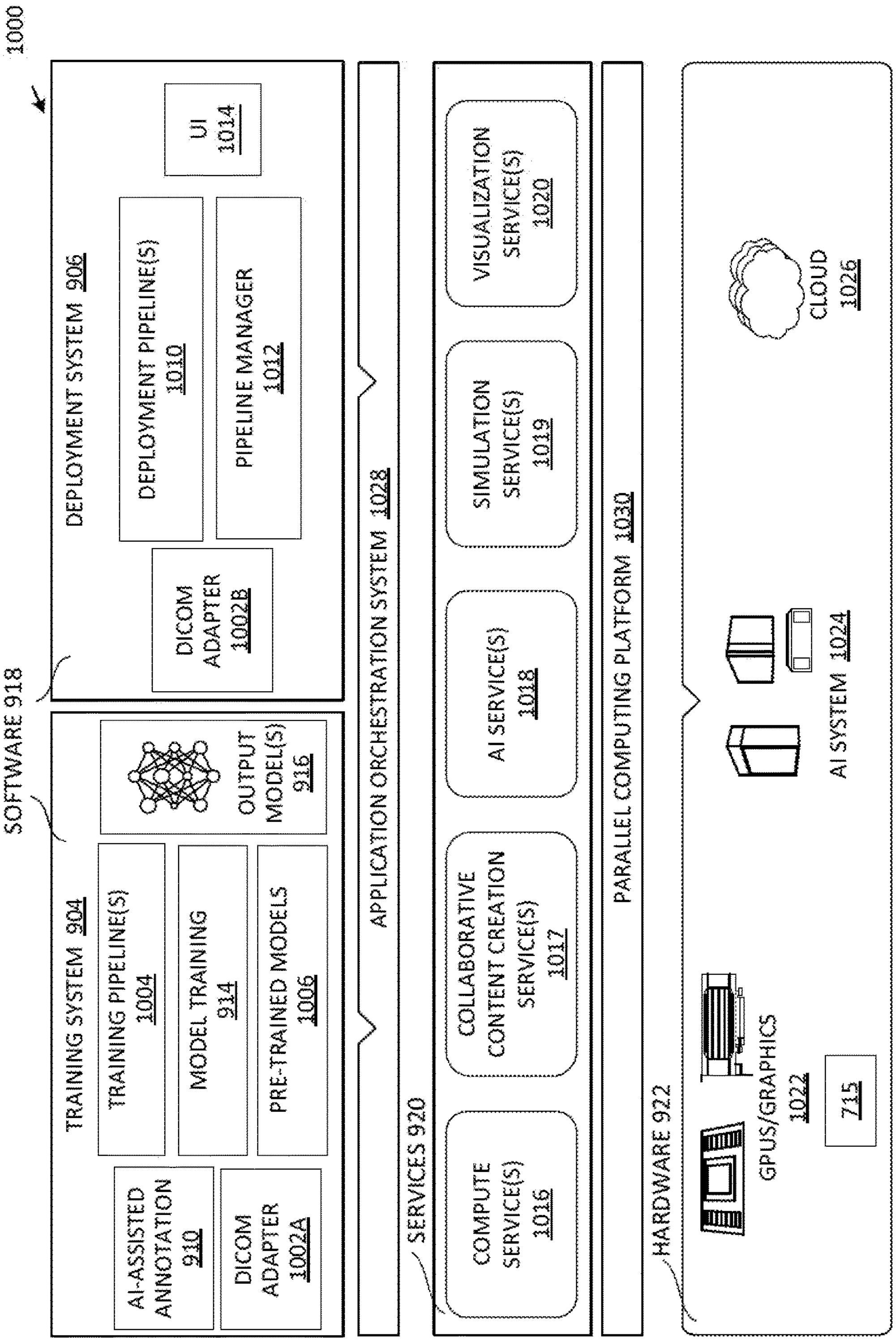
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning super-computer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904. In at least one embodiment, training system 904 and deployment system 906 may include DICOM adapters 1002A and 1002B.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
- obtaining a first speech embedding (SE) representing a first speech utterance of a target speaker, the first speech utterance exhibiting a first degree of an emotion;
- obtaining a second SE representing a second speech utterance of the target speaker, the second speech utterance exhibiting a second degree of the emotion;
- generating, using the first SE and the second SE, a third SE associated with the target speaker and a third degree of the emotion, wherein generating the third SE comprises combining the first SE and the second SE using respective weights that are based at least on (i) a first distance between the first degree of the emotion and the third degree of the emotion and (ii) a second distance between the second degree of the emotion and the third degree of the emotion; and
- generating, using the third SE, a synthetic speech of the target speaker exhibiting the third degree of the emotion.

2. The method of claim 1, wherein the obtaining the first SE comprises:
- obtaining audio data representing the first speech utterance associated with the first degree of the emotion; and
- processing, using a speech embedding model, the audio data to generate the first SE.

3. The method of claim 1, wherein the first degree of the emotion or the second degree of the emotion corresponds to an absence of the emotion.

4. The method of claim 1, wherein the third degree of the emotion is greater than the first degree of the emotion and lesser than the second degree of the emotion, and wherein the generating the third SE comprises:
- interpolating the first SE and the second SE to obtain the third SE.

5. The method of claim 4, wherein the third SE comprises a linear interpolation between the first SE and the second SE.

6. The method of claim 1, further comprising;
- generating, using the third SE, a test speech; and
- obtaining an evaluation metric characterizing a degree of the emotion associated with the test speech.

7. The method of claim 6, wherein the evaluation metric indicates that the degree of the emotion associated with the test speech matches the third degree of the emotion, the method further comprising:
- storing the third SE.

8. The method of claim 6, wherein the evaluation metric indicates that the degree of the emotion does not match the third degree of the emotion, the method further comprising:
- obtaining audio data representing a third speech utterance associated with the third degree of the emotion; and
- processing, using a speech embedding model, the audio data to generate a replacement SE for the third SE.

9. The method of claim 6, wherein the generating the test speech comprises:
- processing, using a text-to-speech (TTS) model:
  - a text of the test speech, and
  - the third SE.

10. A method comprising:
- obtaining an indication of a target degree of an emotion associated with a text and a target speaker;
- identifying a plurality of reference speech embeddings (SEs) associated with the target speaker, wherein an individual reference SE of the plurality of reference SEs is associated with a respective degree of the emotion of a plurality of degrees of the emotion;
- generating a target SE associated with the target degree of the emotion, wherein the target SE is generated by combining a subset of the plurality of reference SEs using weights based at least on distances between the target degree of the emotion and the respective degrees of the emotion associated with the subset of reference SEs; and
- processing, using a text-to-speech (TTS) model, (i) the text and (ii) the target SE to generate an audio of a speech of the target speaker exhibiting the target degree of the emotion and comprising a spoken representation of the text.

11. The method of claim 10, wherein the generating the target SE comprises:
- obtaining a combination of the plurality of reference SEs, wherein an individual reference SE is included in the combination with a weight that is based on:
  - the target degree of the emotion, and
  - a corresponding degree of the emotion associated with the individual reference SE.

12. The method of claim 11, wherein of the plurality of reference SEs comprises:
- a first reference SE associated with a first degree of the emotion that is lower than the target degree of the emotion; and
- a second reference SE associated with a second degree of the emotion that is higher than the target degree of the emotion.

13. The method of claim 10, wherein the plurality of reference SEs comprises an SE associated with an absence of the emotion.

14. The method of claim 10, wherein the TTS model comprises an encoder network and a decoder network, wherein an input into the encoder network comprises:
- the text, and the target SE, and wherein an input into the decoder network comprises:

an output of the encoder network, and the target SE.

15. The method of claim 10, wherein the text and the indication of the target degree of the emotion associated with the text are generated using a language model, a large language model (LLM), or a visual language model (VLM).

16. The method of claim 10, wherein the plurality of reference SEs are obtained using operations comprising:

obtaining a first reference SE of the plurality of reference SEs, the first reference SE representing a first speech utterance associated with a first degree of the emotion of the plurality of degrees of the emotion;

obtaining a second reference SE of the plurality of reference SEs, the second reference SE representing a second speech utterance associated with a second degree of the emotion of the plurality of degrees of the emotion; and generating, using the first reference SE and the second reference SE, a third reference SE associated with a third degree of the emotion of the plurality of degrees of the emotion.

17. The method of claim 10, further comprising:

obtaining an additional indication of a second target degree of a second emotion associated with the text;

identifying a second plurality of reference SEs, wherein an individual reference SE of the second plurality of reference SEs is associated with a corresponding degree of the second emotion of a plurality of second degrees of the emotion, wherein the target SE is further associated with the second target degree of the second emotion; and wherein the target SE is generated using at least a second subset of the second plurality of reference SEs.

18. The method of claim 17, wherein the target SE comprises a combination of the plurality of reference SEs and the second subset of the second plurality of reference SEs, wherein an individual reference SE is included in the combination with a weight that is based on at least one of:

the target degree of the emotion and a corresponding degree of the emotion associated with the individual reference SE, or the second target degree of the second emotion and a corresponding degree of the second emotion associated with the individual reference SE.

19. A system comprising:

one or more processors to generate synthetic speech in a voice of a target speaker using a machine learning model-readable speech embedding (SE) associated with a target degree of an emotion and with the target speaker and obtained, at least in part, by combining a plurality of reference SEs associated with respective reference degrees of the emotion displayed by the target speaker in a respective plurality of speech utterances of the target speaker.

20. The system of claim 19, wherein the system is comprised in at least one of:

an in-vehicle infotainment system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, mixed reality content, or augmented reality content;

a system implemented using a robot;

a system for performing conversational AI operations;

a system implementing one or more language models;

a system implementing one or more large language models (LLMs);

a system implementing one or more visual language models (VLMs);

a system for generating synthetic data;

a system incorporating one or more virtual machines (VMs);

a system implemented at least partially in a data center; or a system implemented at least partially using cloud computing resources.

* * * * *